Aug. 13, 1968 C. B. KREKELER 3,397,013
CUTTER BITS AND MEANS FOR MOUNTING THEM
Filed Aug. 4, 1967 2 Sheets-Sheet 1
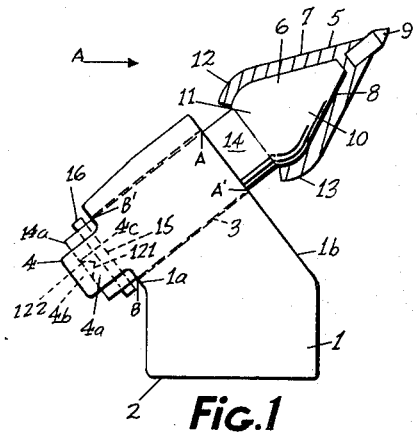
Fig.1
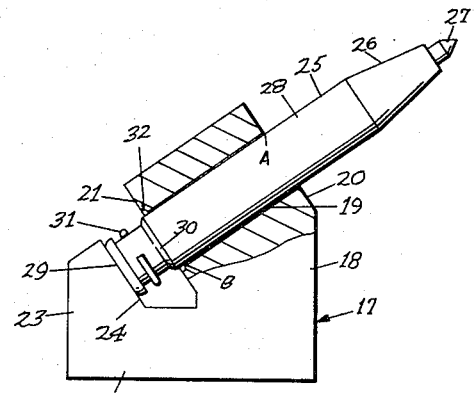
Fig.2
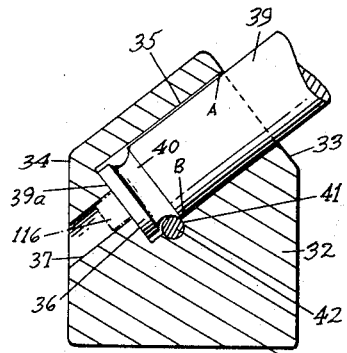
Fig.3
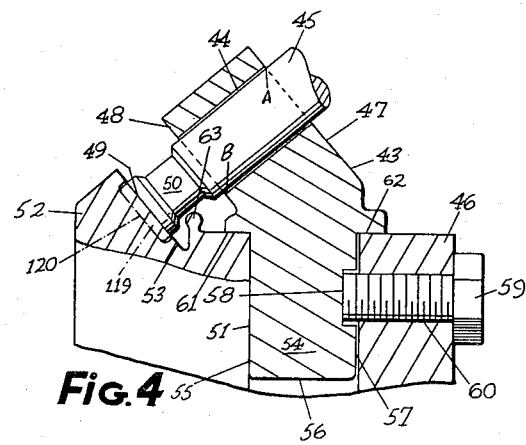
Fig.4
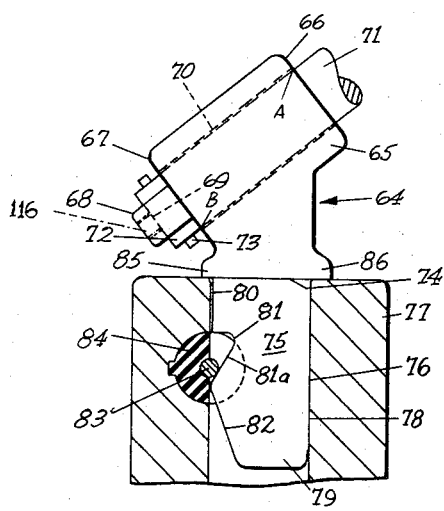
Fig.5
Fig.6
INVENTOR/S
CLAUDE B. KREKELER,
BY *Melville, Strasser, Foster and Hoffman*
ATTORNEYS Aug. 13, 1968   C. B. KREKELER   3,397,013
CUTTER BITS AND MEANS FOR MOUNTING THEM
Filed Aug. 4, 1967   2 Sheets-Sheet 2

INVENTOR/S
CLAUDE B. KREKELER,
BY Melville, Strasser, Foster and Hoffman
ATTORNEYS United States Patent Office 3,397,013
Patented Aug. 13, 1968

3,397,013
CUTTER BITS AND MEANS FOR
MOUNTING THEM
Claude B. Krekeler, Hamilton County, Ohio, assignor to
The Cincinnati Mine Machinery Co., Cincinnati, Ohio,
a corporation of Ohio
Continuation-in-part of application Ser. No. 611,513,
Dec. 19, 1966. This application Aug. 4, 1967, Ser.
No. 658,539
19 Claims. (Cl. 299—86)

ABSTRACT OF THE DISCLOSURE

Cutting means and mounting means therefor for mining machines and the like, wherein the cutting means is of the type having a shank with circular cross section, a hard cutting tip at one end and an abutment surface at the other end. The mounting means comprises a body portion with a shank receiving perforation therein, the perforation being of a diameter such that the shank is freely rotatable therein, and the perforation has a forward end and a rearward end with an abutment surface in association with the rearward end. The abutment surface lies in a plane non-parallel with the axis of the shank receiving perforation, and is adapted to cooperate with the abutment surface on the shank of the cutting means, there being a male and female engagement between the abutment surfaces.

CROSS-REFERENCES TO RELATED APPLICATIONS

This application is a continuation-in-part of the copending case in the name of the same inventor, Ser. No. 611,-513, filed Dec. 19, 1966, and entitled Cutter Bits and Means for Mounting Them. The last mentioned case is a continuation-in-part of the now abandoned case in the name of the same inventor, Ser. No. 537,158, filed Mar. 24, 1966, and entitled Cutter Bits and Means for Mounting Them.

BACKGROUND OF THE INVENTION

(1) Field of the invention

This case pertains to improved cutter bit means for mining machinery and the like, and improved means for mounting the cutter bit means in cutting positions and for driving them against the face of a seam of coal or other mineral to be mined.

(2) Description of the prior art

There has recently been considerable interest in the mining industry in cutter bits of the type having a conical or tapering exterior configuration and which have a piece of hard cutting alloy mounted at the tip of the bit. Such conical cutter bits may be of two general types. In one type the conical cutter bit has an integral shank adapted to be received in a socket member or bit holder of a mining machine. In this type of bit the conical portion may simply taper to a cutting point, or a tip of hard cutting alloy may be affixed to the conical portion. In some instances the entire cutter bit may be made of hard cutting alloy, with or without a separate hard cutting tip. The other type comprises a conical bit element intended to cooperate with an adaptor, which in turn has a head and a shank portion configured to be received in a bit holder or a socket member. In one form, the bit may comprise a hollow conical member with or without a tip or hard cutting alloy. The head portion of the adaptor is configured to be received within the hollow cutter bit. In another form, the conical cutter bit may have a shank configured to be received in a perforation in the adaptor. Bits of these general types are especially useful for heavy duty applications where the bits have a greater service life and affect a better usage of the hard alloy tips.

The service life of such bits, moreover, is prolonged if provision is made for the slow rotation of such bits about their main axis, the movement referred to being a movement generated by the mutual reaction of the bit itself and the mineral being cut.

The above mentioned copending case, of which this application is a continuation-in-part, is directed to improvements in bits of these general types, and to improvements in mounting means for such cutter bits or cutter bit adaptors. As taught therein, one form of mounting means comprises holders with integral shanks adapted to be received in the shank receiving perforations of conventional socket members. In another form, the mounting means themselves comprise lug or socket members for mining machines. The lugs or socket members may be installed upon chains, wheels or cutter arms of mining machinery (usually by welding them to the driven elements which carry them) and they may be oriented at different angularities to the driven elements so that the cutting points of the various bits will form a cut of sufficient width to permit the passage of the driven element to the extent desired. Often, even the lugs of the center cutting bits may be oriented at a slight lateral angle to the direction of motion of the bit so as to increase the natural tendency of the bit to rotate during the cutting operation.

The socket members or bit holders are generally provided with perforations for the receipt of the shank of a cutter bit or a cutter bit adaptor in such a way that the cutter bit tip will lie above the highest part of the socket member or bit holder, and the axis of the cutter bit will lie at an angle of less than 90° to the direction of motion of the bit in the cutting operation so that the cutting stresses will be sustained more nearly in line with the cutter bit axis.

The shank of the cutter bit or adaptor is preferably of a diameter slightly less than the diameter of the socket member or bit holder perforation so that the shank is freely rotatable therein.

In connection with bits of the type described above, means have to be provided for determining the gauge of the bits, i.e., the depth to which the shanks of the cutter bits or the cutter bit adaptors will enter the perforation in the bit holder or socket member. Prior to the teachings of the above mentioned copending application, forward abutment means were normally provided on the shanks of the cutter bits or the cutter bit adaptors which would contact the socket member at or adjacent its forward face. Often a forward abutment means took the form of an annular shoulder on the shank of the cutter bit or adaptor. In some instances an annular shoulder will be provided with a tapering underside for engagement in a corresponding counter sink at the forward end of the shank receiving perforation in the lug member.

It will be understood by one skilled in the art that cutter bits or cutter bit assemblies of the type described, when used on heavy duty mining machines operating continuously during the mining operation, are subjected to heavier and more continuous strains. The provision of the above mentioned forward abutment means necessitated an abrupt change in diameter of the cutter bit shank or the cutter bit adaptor shank at the juncture between that portion of the shank lying within the shank receiving perforation of the lug, and that portion lying outside the lug.

It was found that such changes of diameter in a shank constituted stress-raisers tending to concentrate the cutting strains, and tending to cause failure of the shank at the position of a stress-raiser. This was found to be true whether the changes in diameter were toward a lesser or a greater diameter. It was further found that it was particularly undesirable to have stress-raising changes in diameter in that portion of a shank which may be termed the "critical zone." Since the diameter of the shank is slightly less than the diameter of the holding means perforation (so that the shank is freely rotatable therein), there will be a forwardmost and a rearwardmost area of contact between the lateral exterior surface of the shank and the corresponding interior surface of the holding means perforation. The critical zone of the shank comprises that portion thereof extending substantially from the above mentioned rearwardmost area of contact to a point beyond and in the immediate vicinity of the above mentioned forwardmost area of contact.

As taught in the above mentioned copending application, the provision of a rear abutment surface on the cutter bit or bit adaptor and an abutment surface in association with the shank receiving perforation of the mounting means enabled the use of a cutter bit or cutter bit adaptor being free of stress-raising diameter changes particularly in the critical zone. Such structure further permitted the use of novel and improved retaining means to prevent removal of the shank of the cutter bit or cutter bit adaptor from the shank receiving perforation of the mounting means. The structures of the copending application have proven in the field to be characterized by a greater strength and a longer life than heretofore obtainable with prior art cutting devices.

It has recently been discovered that in cutting structures of the type taught in the copending application, the useful life of the parts may be appreciably extended and wear on the parts may be appreciably minimized by the provision of a male and female engagement between the abutment surface on the rear end of the shank of the cutter bit or cutter bit adaptor and the abutment surface in association with the shank receiving perforation of the mounting means. In this way a greater area of contact between the cooperating abutment surfaces is achieved thereby minimizing wear. The contact between the inside surface of the shank receiving perforation of the mounting means and the exterior surface of the shank of the cutter bit or cutter bit adaptor is more nearly a line contact, appreciably minimizing wear on both elements. The shank receiving perforation in the mounting means tends to maintain its proper diameter throughout its length. Wear at the rear end of the shank receiving perforation is particularly reduced, whereby the useful life of the shank retaining means is increased. Finally, the male-female engagement of the shank and mounting means abutment surfaces provides a pivot point about which the shank rotates, thus further minimizing any departure from parallelism between the shank of the cutter bit or adaptor and the shank receiving perforation of the mounting means, and further reducing wear of these parts.

SUMMARY OF THE INVENTION

The invention relates to cutting means, and mounting means therefor, particularly for use in mining machines and the like. The cutting means comprise cutter bits or cutter bit adaptors having shanks of circular cross section and free of stress-raising changes in diameter, particularly in the critical zone. The shanks terminate at their rearwardmost ends in abutment surfaces.

The mounting means (which may take the form of lugs or holding means for use with conventional lugs) each have a shank receiving perforation, with an abutment surface in association with the rear end of the shank receiving perforation. The shank receiving perforations of the mounting means and the shanks of the cutter bits or adaptors may be so dimensioned as to permit free rotation of the shanks within the shank receiving perforations.

The cooperating abutment surfaces on the holding means and the shanks of the cutter bits or cutter bit adaptors have a male-female engagement.

It is within the scope of the invention to provide means to reinforce the abutment surface of the mounting means and additional means to reinforce the front and rear ends of the shank receiving perforation. When a cutter bit is used (as opposed to a bit and adaptor assembly) the bit may be double ended, each end capable of serving either as the cutting end or the abutment end.

BRIEF DESCRIPTION OF THE DRAWINGS

FIGURES 1 through 7 are elevational views, partly in cross section, of cutter means and mounting means assemblies of the types to which the teachings of the present invention are applicable.

DESCRIPTION OF THE PREFERRED EMBODIMENTS

Figure 7:
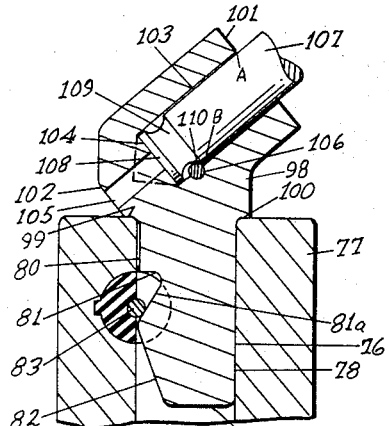

FIGURES 1 through 7 illustrate cutter means and mounting means assemblies of the types to which the teachings of the present invention are applicable. Referring to FIGURE 1, one form of lug or socket member of the present invention is illustrated at 1. The lug has a base 2 by which it may be attached or welded to a cutting wheel, a cutting head, a cutting arm, the links of a cutting chain, or any other means by which the bit may be moved under power in the cutting direction. While a separate lug or socket member has been shown, it does not constitute a departure from the spirit of the invention to provide such a lug as an integral part of a cutting chain, cutting wheel, cutting head, cutting arm or the like.

The lug has a perforation 3 to receive the shank of a bit adaptor or cutter bit. Assuming that the lug is driven in the direction indicated by the arrow A, the axis of the perforation 3 will lie at an angle to the direction of movement. This angle will be less than 90° and of such magnitude that the tip of the bit will lie above the highest part of the lug 1. It will be understood by one skilled in the art that the smaller this angle is, the more nearly the cutting strains will be sustained along the axis of the cutter bit.

The rear face 1a of the lug is provided with a strap 4. The strap 4 is generally U-shaped, the legs of the U-shaped configuration (one of which is shown at 4a) extending rearwardly of the surface 1a. The legs of the U-shaped configuration are joined by a base portion 4b, lying substantially parallel to the rear face 1a of the lug, and presenting an abutment surface 4c which is spaced from the rear opening of the perforation 3. In FIGURE 1 the strap 4 is illustrated as an integral part of the lug or socket member 1. It is within the scope of the invention to form the U-shaped strap 4 as a separate piece, and weld or otherwise join it to the rear face 1a of the sides of the lug.

In FIGURE 1, the lug 1 is illustrated as provided with a cutter bit of the type comprising a conical bit 5 and a bit adaptor 6. The bit itself may be made by forging, by upsetting, by a turning operation, as a screw machine product, by powdered metallurgy and in other ways not constituting a limitation on the present invention. It has a generally tapered outer body surface as indicated at 7 and a conical inner surface 8. The bit itself may be provided with a tip 9 of hard cutting alloy.

The bit 5 may have a frictional engagement with the conical portion 10 of the bit adaptor 6. So long as the sloping faces of the interior hollow 8 of the bit and the outwardly tapering nose portion 10 of the bit adaptor correspond, have a correct angularity, and are correctly proportioned, the bit can be retained frictionally on the bit adaptor in such a way that it will resist the stresses encountered in cutting or bursting the mineral, such as coal being mined.

Where a more positive engagement between the bit and the bit adaptor nose is desired, the bit adaptor may be provided with a portion 11, having a taper opposite to the taper of the portion 10. The lower portion of the bit 5 may be distorted at one or more places (as is indicated at 12 and 13) such that the diameter of the bit will be slightly less than the diameter of the line of juncture between the reversed conical portions 10 and 12 of the bit adaptor nose. The end of the bit will be required to be expanded in order to pass over this line of juncture. This is most conveniently accomplished by placing the bit over the conical portion 10 of the bit adaptor and driving the bit home by a hammer blow on the end of the bit nose, exerted through the use of a tool having an operating face softer than the substance of the hard cutting tip 9. The driving portion of the tool may be faced, for example, with babbitt, brass, bronze or the like. Since the distortion of the lower end of the bit skirt is a resilient distortion, the detents 12 and 13 having passed the aforesaid line of juncture will reform below it and will cause a section or sections of the bit skirt to contract against the tapered portion 11 of the bit adaptor. It will be understood by one skilled in the art that for purposes of clarity the taper of the portion 11 of the bit adaptor and the distortion of the detents 11 and 13 of the cutter bit has been illustrated in exaggerated fashion.

It is within the scope of the invention to provide a bit of the type shown in FIGURE 1 which may be made rotatable with respect to the bit adaptor nose. In this instance, the conical surface of the portion 10 of the bit adaptor and the conical inner surface 8 of the bit need not conform with the degree of accuracy required when these surfaces are to engage each other frictionally. The engagement of the detents 12 and 13 on the tapered bit adaptor portion 11 may be relatively loose, yet sufficient to prevent loss of the bit. The type and configuration of the bit applied to the bit adaptor 6 does not constitute a limitation on the present invention; the bit 5 may be rotatable or non-rotatable with respect to the nose portion of the adaptor 6. The nose portion of the adaptor 6 may be of any suitable configuration and may be provided with any suitable bit structure.

The adaptor 6 has an elongated cylindrical shank 14. The shank 14 will be of suitably constant diameter throughout its length and is adapted to be received in the perforation 3 in the lug 1. The end 14a of the shank is adapted to abut the surface 4c of the strap 4 for gauge determining purposes. Retaining means will be provided in association with the end 14a of the shank for preventing accidental removal of the shank from the perforation 3. In the above mentioned case, of which this case is a continuation-in-part, a plurality of retaining means are illustrated and described. For purposes of an exemplary showing herein, the portion of the shank 14 adjacent the end 14a and which protrudes from the rear opening of the perforation 3, is shown as provided with a transverse hole 15. A pin 16 is tightly engaged in the hole 15 and extends beyond the shank at at least one end. The use of what is known as a "roll pin" constitutes a satisfactory and inexpensive expedient. As known in the art, a roll pin consists of a piece of resilient sheet metal rolled in such a way as to have a slightly larger diameter than the hole into which it is driven. The roll pin will contract to permit driving into the hole 15, and the resiliency of the metal of the roll pin will be such as to cause it to retain its position therein. The end or ends of the roll pin which extend beyond the shank 16 may abut the rear surface 1a of the lug 1 and prevent removal of the shank from the perforation 3.

In the structure of FIGURE 1, the shank 14 should have a reasonably accurate fit within the perforation 3 in the lug member; but it is not necessary and generally not desirable that the fit be tight or frictional in characteristics. Thus, the entire bit adaptor may be free to turn or rotate with respect to the lug 1 under the forces encountered in cutting. This is true irrespective of whether the bit 5 is of the type which will rotate with respect to the adaptor or which will be frictionally held on the adaptor. The length of the roll pin 16 will be less than the distance between the legs of the U-shaped strap 4. Thus, the roll pin will not contact the strap and will not prevent free rotation of the shank 14.

In the embodiment shown in FIGURE 1, when it becomes necessary to remove a worn bit from the bit adaptor, this may be easily accomplished by engaging a prying tool between the skirt of the bit and the forward surface 1b of the lug. The detents 12 and 13 of the bit re-expand so as to pass the lines of juncture between the oppositely tapered portions 10 and 11 of the adaptor nose. When it becomes necessary to remove the bit adaptor from the lug 1, this may be easily accomplished by knocking out the roll pin 16 from the perforation 15. Should the shank of the adaptor become tightly engaged in the perforation 3 due to the accumulation of fines, the action of corrosive mine water or the like, a blow may be administered to that portion of the end 14a of the shank not covered by the strap 4, by means of any suitable tool.

FIGURE 2 illustrates a second embodiment of a socket member or lug having a rear abutment surface, and to which the teachings of the present invention are applicable. The lug generally indicated at 17 has a body portion 18 with a shank receiving perforation 19. The perforation 19 extends from the front surface 20 to the rear surface 21 of the lug. The front and rear surfaces 20 and 21 may be substantially parallel. The body 18 has a rearward extension 22 which includes an upwardly extending anvil or abutment means 23. The anvil 23 is provided with an abutment surface 24 which may be substantially parallel to the rear surface 21 of the lug body. It will be understood by one skilled in the art that a bit and bit adaptor structure of the type shown in FIGURE 1 may be used with the lug 17. For purposes of an exemplary showing, however, the lug 17 is illustrated as being provided with a unitary bit structure generally indicated at 25. It will be understood by one skilled in the art that the unitary bit structure 25 may be used with the lug of FIGURE 1. In fact, all of the mounting means of the present invention may be provided with unitary cutter bits or cutter bit-adaptor assemblies, as desired.

The cutter bit 25 comprises a conical nose portion 26 terminating in a hard cutting tip 27 and a cylindrical shank portion 28 terminating in a rear abutment surface 29. The abutment surface 29 is adapted to cooperate with the lug abutment surface 24.

In the above mentioned application, of which the present application is a continuation-in-part, a plurality of bit or cutter bit-adaptor assembly retaining means are taught, for use in conjunction with a lug of the general type indicated at 17 in FIGURE 2. Any of these retaining means may be utilized in conjunction with the present invention. For purposes of an exemplary showing, the shank 28 of the bit is illustrated as having, near its rear end, an annular groove 30. The groove 30 is adapted to receive a ring 31 which may be continuous and made of resilient stretchable material such as rubber, plastic and the like, or which may be a split metal ring, as illustrated. When a resilient ring of rubber or the like is used, it may be positioned in the annular groove 30 by stretching it over the bit end 29. When a split metal ring is used, it may be located in the annular groove 30 by forcing it over the rear end 29 of the shank, or by applying it radially to the groove.

Any forces tending to pull the bit shank out of the lug perforation 19 will be resisted by the inner action of the ring 31, the rear surface 21 of the lug body, and the rear end of the shank. It is also within the scope of the invention to provide an annular under cut 32 at the rear end of the shank receiving perforation 19, to coact with the ring 31 and prevent its radial expansion, particularly when the ring is made of resilient material such as rubber, plastic or the like.

Again, the diameter of the shank 28, and the internal diameter of the shank receiving perforation 19, will preferably be so proportioned as to render the shank freely rotatable within the shank receiving perforation.

A third embodiment of the lug or socket member to which the present invention is applicable is illustrated in FIGURE 3. Referring to FIGURE 3, the socket member comprises a body 32 with a slanting forward surface 33 and a rear surface 34. The socket member has a shank receiving perforation 35 extending from the surface 33 toward the surface 34. The perforation 35 terminates short of the surface 34 in an abutment surface 36. A bleed hole 37, coaxial with the perforation 35, extends from the abutment surface 36 through the rear surface 34 of the socket member. The bleed hole 37 assures that cutting fines and foreign material will not accumulate in the shank receiving perforation 35. Such an accumulation of fines and foreign material could impair the installation and removal of the shank of a cutter bit or cutter bit adaptor, and might impair the ability of the shank to revolve in the perforation 35. It will be understood by one skilled in the art that the bottom 38 of the socket member may be affixed to any suitable driven element such as a cutter chain, cutter wheel, or the like. It will also be understood that the lug or socket member of FIGURE 3 could be an integral part of a suitable driving element.

A shank 39 of a cutter bit or adaptor is illustrated as located within the perforation 35. The rear abutment surface 39a of the shank is adapted to coact with the abutment surface 36 of the lug. The shank 39 is cylindrical and of substantially constant cross section throughout its length. The diameter of the shank is such that the shank is freely rotatable within the perforation 35.

The above mentioned case, of which the present application is a continuation-in-part, teaches a number of means for retaining the shank 39 within the perforation 35. For purposes of an exemplary illustration, the shank is shown as having an annular notch 40. The body 32 of the lug is provided with a transverse perforation 41 which intersects the shank receiving perforation 35. When the shank 39 is located in the perforation 35, a pin 42 may be inserted in the perforation 41. That portion of the pin 42 which extends into the perforation 35 will coact with the annular notch 40 in the shank to prevent removal of the shank. The shank notch 40 will be so dimensioned as to accept a part of the pin 42 and yet permit free rotation of the shank. Removal of the shank simply requires removal of the pin 42.

FIGURE 4 illustrates another mounting means for a cutter bit or cutter bit-adaptor assembly, to which the present invention is applicable. In this instance, a bit holder 43 is provided having a perforation 44 adapted to receive the shank 45 of a cutter bit or bit-adaptor assembly. In this instance, however, the rear gauge determining abutment means comprises a portion of a lug or socket member 46.

The bit holder 43 has a front face 47 and a rear face 48, with the shank receiving perforation 44 extending therebetween. The shank 45 of a cutter bit or adaptor terminates in an abutment surface 49 and is provided near its rear end with an annular notch 50 for the purpose hereinafter described.

The socket member 46 has a shank receiving perforation 51 and an upstanding rear anvil portion 52. The anvil portion 52 has an abutment surface 53 spaced from the rear surface 48 of the bit holder.

The bit holder 43 has a shank 54 which may be of any suitable configuration. For purposes of exemplary showing, the shank 54 is shown as having a substantially vertical rear edge 55, a horizontal bottom edge 56 and a substantially vertical front edge 57. The front edge 57 is provided with a notch 58 for the receipt of the end of a bolt-type retaining means 59 mounted in a threaded perforation 60 in the socket member 46. The bit holder may also have shoulders providing abutment surfaces 61 and 62, serving to determine the depth to which the shank 54 will extend into the perforation 51 in the socket member.

In an assembly of the general type shown in FIGURE 4, a number of means may be provided for retaining the bit or adaptor shank 45 in the shank receiving perforation 44 (as is taught in the above mentioned parent case). For purposes of an exemplary illustration, the socket member 46 is illustrated as having an upstanding lug 63. While the lug is illustrated as an integral part of the socket member, it will be understood by one skilled in the art that the lug could be a separate and replaceable member.

As illustrated the lug 63 extends upwardly toward the shank of the cutter bit or adaptor in the area of the notch 50. While the lug 63 does not contact the shank in the area of the notch 50, so that the cutter bit may be freely rotatable, it nevertheless extends to a height such that the rear portion of the shank will not clear it, and thus when the bit holder 43 is in seated position in the socket member 46, the cutter bit is firmly held therein.

The cutter bit or adaptor shank 45 may be inserted in the bit holder perforation 44 from the front of the bit holder. Thus, in order to remove and replace the cutter bit or adaptor, it is only necessary to loosen the bolt 59 and raise the bit holder 43 by an amount sufficient to allow the end of the shank 45 to clear the lug 63. A new bit or bit adaptor may then be inserted in the bit holder, and the bit holder seated in the socket member perforation 51. When the bolt 59 is tightened, both the bit holder 43 and the shank 45 will be firmly held in place.

The mounting means illustrated in FIGURES 1 through 3, have been described as lug or socket members which may be affixed to or constitute an integral part of a cutter chain, cutter wheel or the like. It is also within the scope of the present invention to make mounting means similar to those shown in FIGURES 1 through 3 in the form of bit holders for use with conventional socket members. Such bit holders are illustrated in FIGURES 5, 6 and 7, and it will be noted that the bodies of the bit holders are substantially the same as the above described lug bodies. As is well known to one skilled in the art, there are several conventional types of socket members in use today, and the type of shank with which a bit holder of the present invention is provided will depend upon the type of conventional socket member with which the bit holder is intended to be used. While size does not constitute a limitation on the present invention, it will generally be preferable to make the bodies of the bit holders and the bit or bit and adaptor assemblies smaller than the bodies of the lugs and bits and bit assemblies described above. FIGURE 5 shows a bit holder comprising an adaptation of the lug or socket member illustrated in FIGURE 1. The bit holder generally indicated at 64 has a body 65 having a forward surface 66 and a rear surface 67. The holder also has a U-shaped strap-like element 68 providing an abutment surface 69. The abutment surface 69 extends across and is spaced from the rear opening of the shank receiving perforation 70. As indicated above with respect to the lug of FIGURE 1, the strap element 68 may be integral with the body 65 or may be permanently affixed to the rear surface or the sides thereof.

The bit holder of FIGURE 5 may be used with any of the bits or adaptor-bit assemblies and retaining means described above with respect to FIGURES 1 through 3, or described in the above mentioned application of which this application is a continuation-in-part. For purposes of an exemplary showing, a shank 71 of a cutter bit or adaptor is shown as having an abutment surface 72 and a retaining pin 73.

The base or bottom 74 of the body 65 will have a downwardly depending shank 75 adapted to be received in the shank receiving perforation 76 of a conventional socket member 77. While the configuration of the shank 75 will vary depending upon the type of conventional socket member and retaining means being used, for purposes of an exemplary showing the bit holder of FIGURE 5 is illustrated as having a shank of the type used with that form of conventional socket member employing the resilient retaining means taught in United States Letters Patent No. 2,965,365. Shanks of the type shown at 75 are described in that patent and others including United States Letters Patent No. 3,114,537, dated Dec. 17, 1963 in the name of the present inventor. The shank 75 is of a width substantially equal to the width of the shank receiving perforation in the socket member, and has a vertical front edge 78 and a horizontal bottom edge 79. The rear of the shank 75 has a short vertical edge 80 a notch 81 and a downwardly and inwardly slanting surface 82. During installation the slanting surface 82 will cause the pin 83 of the resilient retaining means 84 to be depressed and removed from the socket member perforation 76 so that the bit holder may be fully seated. In its fully seated position, the pin 83 of the resilient retainer will engage in the notch 81. Removal of the bit holder may be accomplished by any suitable prying tool. An upward force on the bit holder will cause the notch surface 81a to coact with the resilient retaining means pin 83 to depress the pin out of the shank receiving perforation in the socket member, releasing the shank 75.

The bit holder means of FIGURE 5 may also be provided with one or more gauge determining abutments 85 and 86. The abutments 85 and 86 will cooperate with the top of the socket member and will determine the depth to which the shank 75 will extend into the socket member perforation 76.

FIGURE 6 illustrates a bit holder similar to that of FIGURE 2, but adapted for use with a conventional socket member. For purposes of an exemplary showing, the bit holder generally indicated at 87 is shown as provided with a shank for use in that type of conventional socket member shown in FIGURE 5. Like parts have been given like index numerals. The bit holder 87 is substantially the same in configuration as the lug of FIGURE 2, having a body 88 with a forward surface 89 and a rearward surface 90. The bit holder also has an anvil portion 91 with an abutment surface 92 spaced from the rear surface 90 of the body portion. For purposes of an exemplary illustration, a shank 93 of a cutter bit or adapter is illustrated as located within the shank receiving perforation 94 of the body 88. The shank 93 has a rear abutment surface 95 adapted to cooperate with the abutment surface 92. The end portion of the shank has an annular notch 96 for the receipt of a retaining means such as a split metal ring 97.

FIGURE 7 illustrates a bit holder constituting an adaptation of the mounting means illustrated in FIGURE 3. The bit holder of FIGURE 7, for purposes of an exemplary showing, has been illustrated as being provided with a shank of the type adapted to cooperate with a socket member and resilient retainer such as are illustrated in FIGURE 5. Therefore, like parts have been given like index numerals.

The bit holder has a body 98 with gauged determining abutments 99 and 100. The bit body has a forward surface 101 and a rearward surface 102. A shank receiving perforation 103 extends inwardly from the front surface 101 and terminates in an abutment surface 104. A bleed hole 105, coaxial with the perforation 103, extends from the abutment surface 104 to the rear surface 102 of the bit holder body.

The body 98 is provided with a transverse hole 106 intersecting the shank receiving perforation 103. For purposes of an exemplary illustration, a shank 107 of a cutter bit or cutter bit-adaptor assembly is shown seated in the perforation 103. The rear end 108 of the shank coacts with the abutment surface 104. The shank is also provided with an annular notch 109 which cooperates with a pin 110 in the same manner described with respect to the notch 40 and pin 42 in FIGURE 3.

It will be noted that in all of the figures described thus far, the cutter bit shank or adaptor shank is free of stress-raising changes in diameter, particularly in the critical zone. In all of the figures, the critical zone lies between the point B and a point just forward of point A. In the embodiments shown in FIGURES 3 and 7, those portions of the shanks 39 and 107 lying behind the annular notches 40 and 109 respectively, are of slightly smaller diameter than those portions of the shanks ahead of the notches, so that the point B lies at the forward edge of the notch in each embodiment.

As will be understood by one skilled in the art, the points A and B represent the contact points between the cutter bit or adaptor shank and the shank receiving perforation when the cutter bit is being driven in the cutting direction. Should the cutter bit be driven in the opposite direction, the point A would shift downwardly and the point B would shift upwardly. This is illustrated in FIGURE 1 by points A' and B'. As will be understood by one skilled in the art, since the shank is preferably freely rotatable within the shank receiving perforation, the forwardmost point of contact at any given instant may be at any point on a circular locus of points including point A and A'. Similarly, the rearwardmost point of contact may at any given instant constitute any point on a circular locus of points including points B and B'. Irrespective of the direction in which the assembly is being moved, it will be noted that in all of the embodiments above described the critical zone of the bit or adaptor shank is free of stress-raisers.

It has been found that the above described structures are characterized by a strength and useful life far greater than heretofore achieved by prior art structures. It has further been discovered, however, that the useful life span of these structures may be further increased if the abutment surfaces on the bit or adaptor shank and on the lug or bit holder are configured to have a male and female engagement. The provision of such a male and female engagement of the abutment surfaces tends to minimize wear both of the cutter bit or adaptor shank and of the shank receiving perforation in the mounting means. Such wear is caused primarily by wobble of the cutter bit or adaptor shank in the shank receiving perforation during the cutting operation. Such wobble tends to produce an annular area of wear both at the forward and at the rearward end of the shank receiving perforation. Should such wear become excessive, over a period of use, it is possible for the shank receiving perforation to become sufficiently enlarged to enable loss of the cutter bit in spite of the provision of retaining means therefor.

FIGURES 8-14 illustrate a number of embodiments of the male and female engagement between the abutment surface on the cutter bit or adaptor shank and the abutment surface on the mounting means. While, for purposes of an exemplary showing, the abutment surface configurations are illustrated with respect to an embodiment similar to that shown in FIGURE 2, it will be understood by one skilled in the art (and shown hereinafter) that any of the abutment surface configurations of FIGURES 8-14 may be applied to any of the structures illustrated in FIGURES 1–7.

Figure 8:
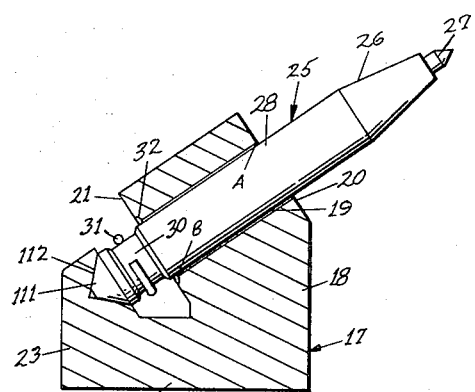
FIGURE 8 is a view partly in elevation and partly in section of a lug, a cutter bit and retaining means therefor, illustrating one form of abutment surface of the present invention.

Referring to FIGURE 8, the cutter bit and mounting means therefor is substantially the same as that shown in FIGURE 2, and like parts have been given like index numerals. In this instance, however, the cutter bit shank 28 terminates in an abutment surface 111 which is substantially conical in configuration. The anvil portion 23 of the lug 17 is provided with an abutment surface 112 in the form of a substantially conical depression. The angularities of the taper of the lug abutment surface 112 and the bit abutment surface 111 are substantially the same so that the two abutment surfaces have substantially a full surface-to-surface contact.

Free rotation of the shank 28 in the shank receiving perforation 19 prevents any undue accumulation of fines in the depressed abutment surface 112 of the lug. Some accumulation of fines in the depressed abutment surface 112 may be desirable. For example, when mining coal or the like, a thin layer of coal between the abutment surfaces 111 and 112 will serve to diminish wear of the abutment surfaces themselves, there being a metal-to-coal-to-metal abutment, rather than a metal-to-metal abutment.

It will be noted from FIGURE 8 that the points of contact between the shank 28 and the lug 17 are no longer located at points A and B, but rather are located at points A and the abutment surfaces. Thus, wear at the rear end of the shank receiving perforation 19 is substantially eliminated. While all wear on the shank receiving perforation 19 is greatly minimized, that which will occur will occur primarily at the forward end of the shank receiving perforation 19. It will be noted, however, that wear at the forward end of the shank receiving perforation will not affect the effectiveness of the shank retaining means 31 at the rear end of the shank receiving perforation.

It will be evident from FIGURE 8 that the rearwardmost area of contact between the cutter bit and the lug is no longer at or adjacent the rear end of the shank receiving perforation 19. Nevertheless, it has been discovered that the critical zone remains substantially the same as described above with respect to FIGURES 1–7 where the rearward area of contact is at or adjacent the rear end of the shank receiving perforation. Thus, in the embodiments of FIGURES 8–14 the critical zone of the shank may be described as comprising that portion thereof extending substantially from the rear end of the shank receiving perforation to a point beyond and in the immediate vicinity of the forwardmost area of contact between the shank and the mounting means. Thus, the shank 28 has no stress-raising changes of diameter within the critical zone. While the notch 30 in the shank 28 lies ahead of the rear contact point (now the abutment surfaces 111 and 112), the notch 30 lies at a sufficient distance from the fulcrum point (i.e., the forward end of the shank receiving perforation) as to preclude it from constituting a significant stress-raiser.

It will be understood by one skilled in the art that all of the characteristics just described with respect to FIGURE 8 will be true of the other embodiments illustrated in FIGURES 9–14.

Figure 9:
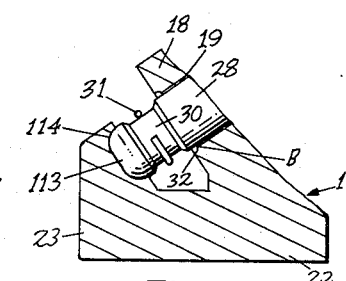
FIGURES 9 through 11 are fragmentary views partly in elevation and partly in cross section illustrating additional embodiments of the abutment surfaces of the present invention.

In FIGURE 9 like parts have been given like index numerals. In this instance the abutment surface on the shank 28 is of rounded configuration as shown at 113. Similarly, the abutment surface on the anvil portion 23 of the lug 17 comprises a rounded depression indicated at 114.

In FIGURE 10 again like parts have been given like index numerals. In this instance the abutment surface on the shank 28 of the bit or adaptor comprises an annular portion 115 and a cylindrical extension 116. The cylindrical extension 116 is coaxial with the axis of the shank 28. The abutment surface on the anvil portion 23 of the lug 17 comprises a flat surface 117. The anvil portion is provided with a perforation 118 to accommodate the cylindrical extension 116 of the shank 28. The cooperation of the cylindrical extension 116 and the anvil perforation 118 provides the male and female engagement of the abutment surfaces, leading to the characteristics described with respect to FIGURE 8.

Figure 11:
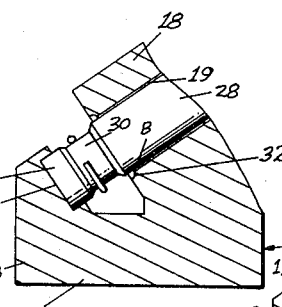

FIGURE 11 shows yet another embodiment of the male and female engagement of the abutment surfaces. Again like parts have been given like index numerals. In this embodiment the end of the cutter bit or adaptor shank 28 is slightly extended to form a cylindrical, flat ended abutment surface 119. The anvil portion of the lug 17 is provided with a matching circular, flat-bottomed depression 120. The engagement of the abutment end 119 of the shank 28 within the abutment depression 120 of the lug constitutes the male and female abutment surface engagement described.

Figure 12:
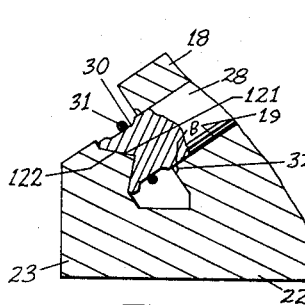
FIGURE 12 is a fragmentary cross sectional view of yet another embodiment of the abutment surfaces of the present invention.

FIGURE 12 illustrates a male and female abutment surface engagement which is substantially the reverse of that shown in FIGURE 8. Like parts have been given like index numerals. In this instance the end of the cutter bit or adaptor shank 28 has a conical depression 121, constituting the abutment surface. The anvil portion 23 of the lug 17, in turn, is provided with an upstanding, conical abutment surface 122. The angularities of the tapers of the surfaces 121 and 122 are substantially the same, to provide a good surface-to-surface contact.

Figure 14:
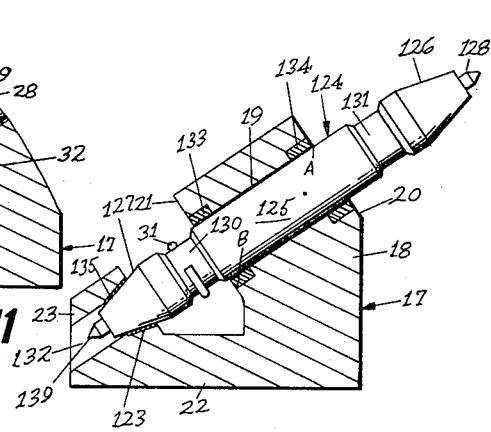
FIGURE 14 is similar to FIGURE 8, but illustrates the use of wear resistant means at the forward and rearward ends of the shank receiving perforation, and the use of a double ended cutter bit.

FIGURE 14 illustrates an embodiment similar to that shown in FIGURE 8, but utilizing a double-ended bit. Like parts have again been given like index numerals. In this instance the lug 17 has an anvil portion 23 with a conical, depressed abutment surface 123. The cutter bit, generally indicated at 124, comprises a shank portion 125, with a first head portion 126 at one end, and a second head portion 127 at the other end. The head portions 126 and 127 are conical in configuration and may be provided with hard cutting tips 128 and 129 respectively.

Adjacent each head portion there is an annular notch as indicated at 130 and 131 for the receipt of a retaining means such as a split metal ring 31.

As will be understood by one skilled in the art, the cutter bit 124 may be located in the lug with one of the head portions 126 and 127 serving as a cutting end of the bit, and the other head portion serving as the bit abutment surface. As illustrated in FIGURE 14, the head portion 126 constitutes the cutting end of the bit, and the conical head portion 127 constitutes the abutment surface of the bit. It will be noted that the anvil portion 23 of the lug has a perforation 132 therein, connecting with the abutment depression 123 and coaxial therewith. The perforation 132 serves not only as a bleed hole for cuttings and other foreign material collecting in the area of the abutment surface 123, but also to accommodate the hard cutting tip 129 of the head element 127.

When the cutting end 126 of the bit 125 becomes worn, the retaining ring 31 may be removed from the annular notch 130 and the bit 25 extracted from the shank receiving perforation 19. The bit may then be reversed and reinserted in the shank receiving perforations in such a way that the head portion 126 will serve as the abutment surface, and the head portion 127 will serve as the cutting end. When so inserted, the split metal retainer ring 31 may then be applied to the annular notch 131 to prevent removal of the bit from the shank receiving perforation 19.

It will be understood by one skilled in the art that the various male and female engagements of the shank and mounting means abutment surfaces illustrated in FIGURES 8–14 may be applied to any of the cutter-mounting means assemblies of FIGURES 1–7. For purposes of an exemplary showing, FIGURES 1–7 have indicated in dot-dash lines therein abutment surface configurations corresponding to the various embodiments of FIGURES 8–12. Thus, the dot-dash line indication of abutment surfaces in FIGURE 1 correspond to the abutment surfaces illustrated in FIGURE 12, and like parts have been given like index numerals. Similarly, the dot-dash line indications in FIGURE 3 correspond to the abutment surfaces illustrated in FIGURE 10. In like manner, the dot-dash line indications in FIGURES 4–7 correspond respectively to the abutment surfaces illustrated in FIGURES 11, 10, 9 and 8 respectively.

It will further be understood by one skilled in the art that any of the mounting means shown in FIGURES 1–7 may be provided with a double ended bit of the type shown at 125 in FIGURE 14. In such an instance, the abutment surface on the lug or bit holder should correspond to the abutment surface shown in FIGURE 14 at 123. In the assemblies shown in FIGURES 2, 4 and 6, bleed holes should be provided to accommodate the hard cutting tip of the double ended bit.

Figure 10:
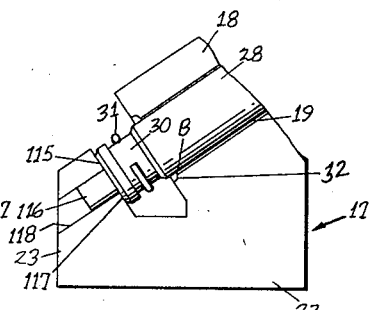

All of the embodiments illustrated in FIGURES 8, 9 and 11 may be provided with bleed holes similar to those shown at 118 in FIGURE 10 and 132 in FIGURE 14.

In the above mentioned application, of which the present application is a continuation-in-part, it was taught that the shank receiving perforations in the lugs or bit holders may be provided with hollow sleeves extending substantially the length of the shank receiving perforations. Various means were taught for holding such a sleeve in place in a shank receiving perforation. The internal diameter of a sleeve would be such as to permit free rotation therein of the shank of a cutter bit or cutter bit adaptor. In such an assembly it would be the sleeve, rather than the shank receiving perforation itself, which would be worn during the cutting operations. When a sleeve became excessively worn, it could simply be replaced. While such a sleeve (not shown herein) could be applied to any of the assemblies illustrated in FIGURES 1–7, the provision of a male and female engagement between the abutment surfaces on the bit or bit adaptor and the lug or bit holder minimize the wear of the shank receiving perforation to the extent that in most instances such a sleeve would not be required. It is within the scope of the present invention, however, to provide a shank receiving perforation with hard metal inserts when desired. For purposes of an exemplary showing, such hard metal inserts are illustrated at 133 and 134 in FIGURE 14. The hard metal inserts are in the form of rings. The ends of the shank receiving perforation 19 are notched to accept the rings which may be affixed in place by any suitable means including a friction fit.

It is within the scope of the present invention to reinforce the abutment surface on the mounting means (and the abutment surface on the bit or adapter shank if desired) by any suitable means. For example, the abutment surface may be covered with a layer of hard surfacing material such as high speed steel, manganese steel, and the like, or the abutment surface may be coated with a thin layer of carbide particles in a suitable binder. Such a coating is indicated, for purposes of an exemplary showing, at 135 in FIGURE 14.

Figure 13:
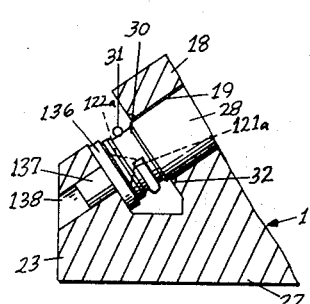
FIGURE 13 is a cross sectional fragmentary view similar to FIGURE 12 but illustrating a replaceable abutment surface on the holding means.

It is further within the scope of the present invention to make the abutment surface on the lug or bit holder means a separate, replaceable element. For purposes of an exemplary showing, FIGURE 13 illustrates an abutment configuration similar to that shown in FIGURE 12. Like parts have been given like index numerals. In this instance, however, the conical abutment surface 122a is a surface located on a separate element 136 having a rearwardly extending cylindrical stem 137. The anvil portion 23 of the lug 17 has a bore 138 extending therethrough, and coaxial with the shank receiving perforation 19. The bore 138 is so dimensioned as to receive the stem 137 of the abutment element 136 in a friction fit. When the abutment surface 122a of the abutment means 136 becomes excessively worn, the abutment element may be replaced. It may be removed from the lug by the insertion of a suitable tool within the perforation 138 and a blow imparted to the tool sufficient to dislodge the stem 137 from the perforation 138. It will be understood by one skilled in the art that the other mounting means abutment surfaces illustrated in FIGURES 8–11 may similarly be formed as surfaces on separate elements affixable to the anvil portion 23 of the mounting means.

Modifications may be made in the invention without departing from the spirit of it.

The embodiment of the invention in which an exclusive property or privilege is claimed are defined as follows:

1. A mounting means for a cutting tool of a mining machine and the like, said cutting tool being of the type having a shank of circular cross section with a cutting tip at one end and an abutment surface at the other end, said mounting means comprising a body portion having a shank receiving perforation, said body being movable in a cutting direction, the axis of said perforation sloping toward said cutting direction and forming an angle of less than 90° therewith such that the resultant cutting stresses will be sustained substantially in line with the axis of said shank, said perforation being of a diameter such that said shank is freely rotatable therein, said perforation having a forward end and a rearward end, an abutment surface in association with the rearward end of said perforation, said abutment surface adapted to cooperate with and have a male-female engagement with said first mentioned abutment surface on said shank.

2. The structure claimed in claim 1 wherein said abutment surface on said mounting means is covered with a thin wear-resistant layer.

3. The structure claimed in claim 1 wherein said abutment surface on said mounting means comprises a separate replaceable element removably affixed to said mounting means.

4. The structure claimed in claim 1, wherein said abutment surface in association with said rearward end of said perforation comprises a surface separate and distinct from said perforation.

5. A cutting tool and mounting means therefor for mining machines and the like, said cutting tool having a shank with a circular cross section, a cutting tip at one end of said shank and an abutment surface at the other end of said shank, said mounting means comprising a body portion with a shank receiving perforation therein, said shank located within said perforation and being freely rotatable therein, said mounting means being movable in a cutting direction, the axis of said perforation sloping toward said cutting direction and forming an angle of less than 90° therewith such that the resultant cutting stresses will be sustained substantially in line with the axis of said shank, said perforation having a forward end and a rearward end, an abutment surface in association with said rearward end, said last mentioned abutment surface adapted to cooperate with said abutment surface on said shank, said abutment surfaces having a male and female engagement therebetween.

6. The structure claimed in claim 5 wherein said abutment surface on said mounting means comprises a flat surface substantially perpendicular to the axis of said shank receiving perforation, said flat surface having a hole therein and extending rearwardly thereof, said hole being coaxial with and of a smaller diameter than said shank receiving perforation, said abutment surface of said shank comprising a flat surface perpendicular to the axis of said shank and adapted to cooperate with the flat surface on said mounting means, said shank having a cylindrical extension extending rearwardly of said flat surface on said shank, said extension and said shank being coaxial, said extension having a diameter slightly smaller than the diameter of said hole whereby to be receivable within said hole.

7. The structure claimed in claim 5 wherein said abutment surface on said mounting means comprises a substantially conical depression terminating in a hole substantially coaxial with said shank receiving perforation, said cutting means shank having a conical portion at each end, each of said conical portions terminating in a cutting tip, each of said conical portions of said cutting means being so configured as to be receivable within said depression, each of said cutting tips being receivable within said hole.

8. The structure claimed in claim 5 wherein said abutment surface on said mounting means comprises a substantially conical extension, said abutment surface on said cutting means shank comprises a substantially conical depression, said extension being receivable within said depression.

9. The structure claimed in claim 5 wherein said abutment surface on said mounting means comprises a depression, said abutment surface on said cutting means comprises an extension on said end of said shank, said extension being receivable within said depression.

10. The structure claimed in claim 9 wherein said depression and said extension are substantially conical in configuration.

11. The structure claimed in claim 9 wherein said depression is cylindrical, being coaxial with said shank receiving perforation and having a flat bottom substantially perpendicular to the axis of said shank receiving perforation, said extension being cylindrical and terminating in a flat surface substantially perpendicular to the axis of said shank.

12. The structure claimed in claim 9 wherein said extension has a rounded configuration, said depression being of a correspondingly rounded configuration.

13. A cutting tool for use with a mounting means of the type having a shank receiving perforation, there being an abutment surface in association with the rearward end of said perforation, said cutting tool comprising a shank with a cutting tip at one end and an abutment surface at the other end, said shank having a diameter such that said shank is freely rotatable within said perforation, said abutment surface on said shank being so configured as to have a male-female engagement with said first mentioned abutment surface.

14. The structure claimed in claim 13 including an annular groove in said shank adjacent the said abutment surface on said shank.

15. The structure claimed in claim 13, wherein said diameter of said shank comprises the maximum dimension of said tool transverse its long axis.

16. The structure claimed in claim 13, wherein said abutment surface on said shank is so configured as to cooperate with said first mentioned abutment surface to sustain both lateral and axial cutting stresses on said cutting tool.

17. The structure claimed in claim 13 wherein said shank has a conical portion at each end, each of said conical portions terminating in a cutting tip and each of said conical portions comprising an abutment surface capable of having said male-female engagement with said first mentioned abutment surface.

18. The structure claimed in claim 17 including two annular grooves in said shank, each of said grooves being located adjacent one of said conical portions.

19. A cutting tool for use with a mounting means of the type having a shank receiving perforation, there being an abutment surface in association with the rearward end of said perforation, said cutting tool comprising a shank with a cutting means at one end and an abutment surface at the other end, said shank having a diameter such that said shank is freely rotatable within said perforation, said abutment surface on said shank being conical and so configured as to have a male-female engagement with said first mentioned abutment surface.

References Cited

UNITED STATES PATENTS

| | | | |
|---|---|---|---|
| 942,412 | 12/1909 | Rich | 172—713 X |
| 1,747,908 | 2/1930 | Seifert | 175—354 X |
| 1,790,613 | 1/1931 | Gildersleeve et al. | 175—354 X |
| 1,903,772 | 4/1933 | Bowman | 299—86 X |
| 3,268,260 | 8/1966 | Snipe | 299—91 |

FOREIGN PATENTS 1,923,922   5/1965   Germany.

ERNEST R. PURSER, *Primary Examiner*.